(12) United States Patent
Larkins

(10) Patent No.: US 12,239,224 B2
(45) Date of Patent: Mar. 4, 2025

(54) VEGETATION HANGING AND DRYING SYSTEM AND BRACKETS THEREOF

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 137 days.

(21) Appl. No.: 17/579,807

(22) Filed: Jan. 20, 2022

(65) Prior Publication Data

US 2022/0312965 A1 Oct. 6, 2022

Related U.S. Application Data

(60) Provisional application No. 63/171,115, filed on Apr. 6, 2021.

(51) Int. Cl.
| | |
|---|---|
| *A47B 96/06* | (2006.01) |
| *A01F 25/12* | (2006.01) |
| *A47B 57/42* | (2006.01) |
| *A47B 57/52* | (2006.01) |
| *F16M 13/02* | (2006.01) |

(52) U.S. Cl.
CPC .............. *A47B 96/06* (2013.01); *A01F 25/12* (2013.01); *A47B 57/42* (2013.01); *A47B 57/52* (2013.01); *A47B 96/068* (2013.01); *F16M 13/02* (2013.01)

(58) Field of Classification Search
CPC ..... A47B 96/06; A47B 96/068; A47B 57/402; A47B 57/40; A47B 57/406; A47B 57/50; A47B 57/16; A47B 57/42; A47B 57/52; A01F 25/12; F16M 13/02

USPC .......................................................... 211/192
See application file for complete search history.

(56) References Cited

U.S. PATENT DOCUMENTS

| | | | |
|---|---|---|---|
| 941,448 | A | 11/1909 | Haglund |
| 945,729 | A | 1/1910 | Rangnow |
| 1,321,997 | A | 11/1919 | Duberstein |
| 1,515,078 | A | 11/1924 | Sheee |
| 1,833,388 | A | 11/1931 | Carmack |
| 1,868,638 | A | 7/1932 | Mackey |

(Continued)

FOREIGN PATENT DOCUMENTS

| | | | |
|---|---|---|---|
| CA | 2458956 A1 | 9/2004 | |
| CN | 105474854 A | 4/2016 | |

(Continued)

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-hanging-herb-dryer/.

(Continued)

*Primary Examiner* — Taylor Morris
(74) *Attorney, Agent, or Firm* — George Likourezos; Carter, DeLuca & Farrell LLP

(57) ABSTRACT

A bracket for use in a vegetation hanging and drying system includes a mounting plate configured to couple to a vertical support shaft of the vegetation hanging and drying system, and a racking plate extending from the mounting plate and configured to receive a horizontal bar of the vegetation hanging and drying system.

15 Claims, 6 Drawing Sheets

(56) References Cited

U.S. PATENT DOCUMENTS

| | | | | |
|---|---|---|---|---|
| 1,983,470 | A * | 12/1934 | Knape | A47B 57/42 248/243 |
| 2,099,596 | A | 11/1937 | Bruening | |
| 2,150,869 | A | 3/1939 | Shafarman | |
| 2,279,777 | A | 4/1942 | Dean | |
| 2,289,729 | A | 7/1942 | Robinson et al. | |
| 2,411,856 | A | 12/1946 | Harding | |
| 2,484,449 | A | 10/1949 | Fetterman | |
| 2,546,929 | A | 3/1951 | Nampa | |
| 2,580,193 | A | 12/1951 | Richterkessing | |
| 2,586,913 | A | 2/1952 | Burns | |
| 2,634,031 | A | 4/1953 | Klein | |
| 2,671,938 | A | 3/1954 | Roberts | |
| 2,692,711 | A | 10/1954 | Norris et al. | |
| 2,716,513 | A | 8/1955 | Braunstein | |
| 2,828,897 | A | 4/1958 | Gordon | |
| 2,960,761 | A * | 11/1960 | Preader | A47B 57/42 248/65 |
| 3,095,975 | A * | 7/1963 | Cassel | A47B 57/402 D6/675 |
| 3,131,817 | A | 5/1964 | Schenkler | |
| 3,152,670 | A * | 10/1964 | Colligan | A47B 57/402 211/187 |
| 3,194,458 | A | 7/1965 | Bennett | |
| D202,954 | S | 11/1965 | Hanson | |
| 3,346,150 | A | 10/1967 | Clopton | |
| D210,333 | S | 2/1968 | Apy | |
| 3,522,920 | A * | 8/1970 | Gray | A47B 57/42 108/107 |
| 3,535,808 | A | 10/1970 | Morrish | |
| 3,565,264 | A * | 2/1971 | Guiher | A47B 57/402 52/842 |
| 3,606,948 | A | 9/1971 | Strang | |
| 3,788,490 | A * | 1/1974 | Featherman | A47B 57/402 211/191 |
| 3,874,572 | A | 4/1975 | McClenning | |
| D236,572 | S | 9/1975 | Ostroll | |
| 3,999,875 | A * | 12/1976 | Simon | A47B 57/482 403/186 |
| 4,067,445 | A * | 1/1978 | Derclaye | A47B 57/402 248/243 |
| 4,129,279 | A * | 12/1978 | Burkholder | A01K 31/17 248/165 |
| 4,146,140 | A * | 3/1979 | Suter | A47B 57/42 211/208 |
| 4,150,753 | A * | 4/1979 | Stahl | A47B 96/067 248/251 |
| 4,154,419 | A * | 5/1979 | Breidenbach | A47B 57/402 211/187 |
| 4,159,814 | A * | 7/1979 | Fibus | A47B 57/42 248/220.21 |
| 4,197,952 | A * | 4/1980 | De Fouw | A47B 47/021 211/208 |
| 4,285,436 | A * | 8/1981 | Konstant | A47B 57/482 211/192 |
| 4,316,546 | A * | 2/1982 | Varon | A47B 57/42 248/251 |
| D264,912 | S | 6/1982 | Bliss et al. | |
| 4,342,397 | A * | 8/1982 | Halstrick | A47B 57/402 403/231 |
| 4,440,369 | A | 4/1984 | Banks | |
| 4,455,007 | A * | 6/1984 | Varon | A47B 96/061 248/300 |
| 4,467,729 | A * | 8/1984 | Featherman | A47B 57/16 108/107 |
| 4,515,494 | A * | 5/1985 | Robilliard | A47B 57/404 211/187 |
| 4,703,878 | A | 11/1987 | Louw | |
| 4,708,252 | A * | 11/1987 | Azzi | A47B 57/402 52/646 |
| 4,717,053 | A | 1/1988 | Wang | |
| 4,724,967 | A | 2/1988 | Valiulis | |
| 4,793,531 | A | 12/1988 | Blanchard et al. | |
| 4,796,541 | A * | 1/1989 | Halstrick | A47B 57/402 108/107 |
| 4,845,602 | A | 7/1989 | Lehocki | |
| 4,874,148 | A * | 10/1989 | Guinter | A47B 57/42 248/220.22 |
| 4,881,342 | A | 11/1989 | Ferguson | |
| 5,007,562 | A | 4/1991 | Brink et al. | |
| 5,074,445 | A | 12/1991 | Chen | |
| D331,425 | S | 12/1992 | Rhyne | |
| D332,180 | S | 1/1993 | Marshall et al. | |
| 5,190,172 | A * | 3/1993 | Tyson | A47B 57/402 211/192 |
| 5,329,728 | A | 7/1994 | Ray | |
| 5,333,409 | A | 8/1994 | Mendes | |
| 5,361,949 | A | 11/1994 | Petrou | |
| 5,377,851 | A * | 1/1995 | Asano | A47B 57/402 211/192 |
| 5,388,354 | A | 2/1995 | Marshall et al. | |
| D357,813 | S | 5/1995 | Koresko | |
| 5,520,311 | A | 5/1996 | Lam | |
| 5,535,927 | A | 7/1996 | Garrison | |
| 5,544,765 | A | 8/1996 | Farbman | |
| 5,581,936 | A | 12/1996 | Belgiorno | |
| 5,813,092 | A | 9/1998 | Greenfield et al. | |
| 5,826,759 | A | 10/1998 | Ohsugi | |
| 5,884,422 | A | 3/1999 | Marshall et al. | |
| 5,938,367 | A * | 8/1999 | Olson | E04B 1/58 211/192 |
| 6,047,867 | A | 4/2000 | Heiber | |
| 6,132,305 | A | 10/2000 | Witherell | |
| 6,158,599 | A * | 12/2000 | Lazarus | A47B 57/42 211/187 |
| 6,293,507 | B1 * | 9/2001 | Gorniak | A47B 57/404 211/183 |
| 6,298,600 | B1 | 10/2001 | Feldman | |
| 6,340,238 | B1 | 1/2002 | Pan | |
| 6,349,863 | B1 | 2/2002 | Frye | |
| 6,389,744 | B1 | 5/2002 | Pugh | |
| 6,641,105 | B1 | 11/2003 | Hamerski | |
| 6,659,295 | B1 | 12/2003 | De Land et al. | |
| 6,811,064 | B2 | 11/2004 | Salem | |
| 6,817,497 | B2 | 11/2004 | Grasso et al. | |
| 6,820,758 | B2 * | 11/2004 | May | A47B 57/50 403/324 |
| D502,756 | S | 3/2005 | Birdwell et al. | |
| 6,863,197 | B1 | 3/2005 | Dirlam et al. | |
| 7,015,815 | B1 | 3/2006 | Feibelman | |
| 7,070,021 | B1 * | 7/2006 | McKinney | A47B 96/00 182/92 |
| 7,178,705 | B1 | 2/2007 | Sutton | |
| 7,377,409 | B1 | 5/2008 | Brown | |
| 7,438,268 | B2 * | 10/2008 | Kologe | A47F 5/0838 248/220.22 |
| 7,774,977 | B2 | 8/2010 | Miller Shelton | |
| 7,984,585 | B1 | 7/2011 | Wu | |
| 8,152,119 | B2 * | 4/2012 | Pfund | F21V 21/08 248/220.21 |
| 8,276,714 | B2 | 10/2012 | Broyles | |
| D711,123 | S | 8/2014 | Birge | |
| 9,113,736 | B1 | 8/2015 | Antler | |
| D772,584 | S | 11/2016 | Debus | |
| 9,782,031 | B2 | 10/2017 | Debus | |
| D806,410 | S | 1/2018 | Denby et al. | |
| D853,737 | S | 7/2019 | Wolfe | |
| D867,770 | S | 11/2019 | Wright | |
| 10,709,267 | B2 * | 7/2020 | Kologe | A47B 57/42 |
| D934,665 | S * | 11/2021 | Cronkhite | D8/381 |
| 11,478,080 | B2 * | 10/2022 | Briosi | F16B 12/32 |
| 11,678,741 | B2 * | 6/2023 | Gonzalez | A47B 96/1408 248/250 |
| 2002/0184799 | A1 | 12/2002 | Chou | |
| 2004/0226971 | A1 | 11/2004 | Detten | |
| 2005/0035159 | A1 | 2/2005 | Hunt et al. | |
| 2005/0139625 | A1 | 6/2005 | Gouldson | |
| 2005/0189383 | A1 | 9/2005 | Weal et al. | |
| 2006/0032130 | A1 | 2/2006 | Lifers et al. | |
| 2006/0226179 | A1 | 10/2006 | Hsu | |

(56) References Cited

U.S. PATENT DOCUMENTS

| | | | |
|---|---|---|---|
| 2007/0062898 A1* | 3/2007 | Choi | A47B 57/408 |
| | | | 211/187 |
| 2007/0187561 A1* | 8/2007 | Xayoiphonh | A47B 43/00 |
| | | | 248/235 |
| 2007/0266627 A1 | 11/2007 | Shelton | |
| 2008/0047474 A1* | 2/2008 | Scholz | A47B 57/40 |
| | | | 108/180 |
| 2008/0236041 A1 | 10/2008 | Carpenter | |
| 2008/0283558 A1 | 11/2008 | Rude et al. | |
| 2011/0247185 A1 | 10/2011 | Bolden et al. | |
| 2011/0284597 A1 | 11/2011 | Kaleta et al. | |
| 2012/0132679 A1 | 5/2012 | Gouldson | |
| 2013/0015215 A1 | 1/2013 | Coote | |
| 2013/0221041 A1 | 8/2013 | Wittenstein et al. | |
| 2014/0138503 A1* | 5/2014 | Consaul | A47B 96/06 |
| | | | 248/214 |
| 2014/0246464 A1 | 9/2014 | Zhong | |
| 2014/0367425 A1 | 12/2014 | Laibe | |
| 2016/0058210 A1 | 3/2016 | Strassburger et al. | |
| 2016/0206095 A1* | 7/2016 | Hansen | A47B 96/068 |
| 2016/0223137 A1 | 8/2016 | Ochipa | |
| 2017/0105362 A1 | 4/2017 | Irving, Jr. | |
| 2017/0231384 A1* | 8/2017 | Erlandsson | A47B 96/061 |
| | | | 248/243 |
| 2017/0238731 A1 | 8/2017 | Davies | |
| 2017/0280875 A1* | 10/2017 | Buckley | A47B 57/34 |
| 2017/0325614 A1 | 11/2017 | Baltz | |
| 2018/0087293 A1 | 3/2018 | Strassburger et al. | |
| 2018/0103785 A1 | 4/2018 | Goldman et al. | |
| 2018/0160833 A1 | 6/2018 | Ho | |
| 2018/0303263 A1 | 10/2018 | Jones et al. | |
| 2018/0317685 A1 | 11/2018 | Boles | |
| 2018/0325299 A1 | 11/2018 | Clark et al. | |
| 2018/0356028 A1 | 12/2018 | Fang | |
| 2019/0014936 A1 | 1/2019 | Beyda et al. | |
| 2019/0307248 A1* | 10/2019 | Murphy | A47B 96/20 |
| 2019/0307264 A1 | 10/2019 | Carr et al. | |
| 2019/0328134 A1* | 10/2019 | Walker | A47B 96/1408 |
| 2019/0380522 A1 | 12/2019 | Johansson | |
| 2020/0085221 A1 | 3/2020 | Riedel et al. | |
| 2020/0128988 A1 | 4/2020 | Moore et al. | |
| 2020/0245796 A1 | 8/2020 | Gilbert | |
| 2020/0323341 A1* | 10/2020 | Briosi | A47B 47/0083 |
| 2021/0137264 A1* | 5/2021 | French | A47F 7/00 |
| 2021/0339108 A1* | 11/2021 | Sorin | A47B 81/00 |
| 2022/0279928 A1* | 9/2022 | Larkins | A01F 25/12 |

FOREIGN PATENT DOCUMENTS

| | | | | |
|---|---|---|---|---|
| CN | 206611910 U | | 11/2017 | |
| CN | 107896731 A | | 4/2018 | |
| DE | 4123421 A1 | * | 1/1993 | A47B 57/42 |
| DE | 3246174 C2 | | 1/1994 | |
| DE | 19624438 C1 | * | 1/1998 | A47B 57/42 |
| EP | 0263009 A1 | * | 4/1988 | A47B 57/402 |
| EP | 0633742 B1 | * | 6/1996 | F16B 12/34 |
| EP | 3644464 A1 | * | 4/2020 | A47B 57/36 |
| FR | 2464638 A1 | | 3/1981 | |
| FR | 2513351 A1 | * | 3/1983 | A47B 57/42 |
| FR | 2919167 A1 | * | 1/2009 | A47B 57/42 |
| FR | 3062120 A1 | | 7/2018 | |
| GB | 2067706 A | * | 7/1981 | A47B 57/402 |
| GB | 2441387 A | * | 3/2008 | A47B 57/404 |
| IT | 1071649 B | * | 4/1985 | A47B 57/402 |
| JP | 2008092939 A | | 4/2008 | |
| JP | 4218802 B2 | | 2/2009 | |
| JP | 4399093 B2 | | 1/2010 | |
| JP | 2011010890 A | | 1/2011 | |
| KR | 960009817 Y1 | * | 11/1996 | A47B 47/0083 |
| KR | 200320245 Y1 | * | 7/2003 | A47B 96/068 |
| KR | 200334180 Y1 | * | 11/2003 | A47F 5/10 |
| KR | 20-2005-0002675 A | | 1/2005 | |
| KR | 2003821320000 Y1 | | 4/2005 | |
| KR | 20100085398 A | * | 7/2010 | A47B 57/08 |
| KR | 2011 0029352 A | | 3/2011 | |
| KR | 101071670 B1 | | 10/2011 | |
| KR | 2012 0131010 A | | 12/2012 | |
| KR | 2017 0067056 A | | 6/2017 | |
| KR | 20170079314 A | | 7/2017 | |
| KR | 101938225 B1 | | 1/2019 | |
| WO | WO-2004089160 A1 | * | 10/2004 | A47B 57/402 |
| WO | 2018150157 A1 | | 8/2018 | |
| WO | WO-2022060888 A1 | * | 3/2022 | A47B 47/0083 |

OTHER PUBLICATIONS

International Search Report and Written Opinion for Application No. PCT/US2020/042261 dated Nov. 2, 2020.

International Search Report and Written Opinion issued in corresponding International Application No. PCT/US2020/053426 dated Jan. 18, 2021, 14 pages.

International Search Report and Written Opinion issued in corresponding International Application No. PCT/US2020/054898 dated Jan. 22, 2021, 14 pages.

International Preliminary Report on Patentability issued in corresponding international application No. PCT/US2020/053426, 6 pages.

* cited by examiner

VEGETATION HANGING AND DRYING SYSTEM AND BRACKETS THEREOF

CROSS-REFERENCE TO RELATED APPLICATION

This application claims the benefit of and priority to U.S. Provisional Application No. 63/171,115, filed on Apr. 6, 2021, the entire contents of which are incorporated by reference herein.

TECHNICAL FIELD

The present disclosure generally relates to support brackets, and more specifically to pallet-rack brackets and shelving unit brackets for use in a vegetation hanging and drying system.

BACKGROUND

Recently there has been a widespread growth of the use of *cannabis* and hemp ranging from medicine to recreational. In this widespread growth, the drying of *cannabis* and hemp has become an essential part of processing *cannabis* and hemp, but the process takes a significant amount of time and effort. Typically, the drying process requires the hemp and/or *cannabis* to be hung with plastic netting, which is not only time-consuming but requires a lot of manual labor and leaves little room for error.

The process requires the hemp and/or *cannabis* to be hung one branch at a time and threaded through the netting to secure the hemp and/or *cannabis*. Removal of the hemp and/or *cannabis* requires careful unthreading of the hemp and/or *cannabis* from the plastic netting. Other methods have been contemplated, such as bailing wires, string and/or ropes, screens, chains, fencing, and combinations thereof, all of which cause damage to hemp and/or *cannabis*. Additionally, from harvest to drying there are multiple points of contact with the hemp and/or *cannabis* that diminish the quality of the finished dried product. Therefore, there is a need to provide a system and method of hanging and drying vegetation, such as, hemp, *cannabis*, and other plants harvested and subsequently dried, without damaging the vegetation.

SUMMARY

The present disclosure provides a vegetation hanging and drying system that includes a bracket. The bracket includes a mounting plate configured to abut a vertical support shaft of the vegetation hanging and drying system, an anchor attached to the mounting plate and configured to secure the mounting plate to the vertical support shaft, a racking plate protruding from the mounting plate and defining a vertically-extending gap configured for receipt of a horizontal hanging bar, and a stabilizing plate extending away from the racking plate.

In aspects, the anchor may be configured to be inserted through a slot defined in the vertical support shaft of the vegetation hanging and drying system.

In aspects, the anchor may include a body portion protruding from a face of the mounting plate, and an end portion affixed to the body portion.

In aspects, a diameter of the end portion may be greater than a diameter of the body portion.

In aspects, the racking plate may include a pair of vertical fingers joined by a lower body to define the vertically-extending gap.

In aspects, the stabilizing plate may be directly attached to the lower body of the racking plate and may extend perpendicularly relative to the pair of vertical fingers.

In aspects, a first finger of the pair of vertical fingers may be directly adjoined to the mounting plate and a second finger of the pair of vertical fingers may be free-standing.

In aspects, the first finger may be taller than the second finger.

In aspects, the mounting plate and the racking plate may extend perpendicularly relative to one another.

In aspects, the mounting plate may include a pair of first and second mounting plates extending perpendicularly from a longitudinal edge of the racking plate. Each of the first and second mounting plates may have a respective anchor.

In aspects, the stabilizing plate may extend between the pair of first and second mounting plates and coplanar with the racking plate. The stabilizing plate may be configured to rest against an outer sidewall of the vertical support shaft of the vegetation hanging and drying system.

In aspects, the anchor of each of the first and second mounting plates may be configured to bend outwardly.

In aspects, the stabilizing plate may extend underneath and rearwardly beyond the mounting plate to provide additional leveraged support for the horizontal hanging bar of the vegetation hanging and drying system.

In aspects, the mounting plate may include a circular indentation configured to indicate a position of the anchor.

In aspects, the mounting plate may include a circular aperture configured to align with a secondary slot disposed on the vertical support shaft of the vegetation hanging and drying system, such that a fastener can be inserted through both the mounting plate and the vertical support shaft of the vegetation hanging and drying system.

In accordance with another aspect of the present disclosure, a vegetation hanging and drying system is provided that includes a vertical support shaft defining a plurality of slots along a length thereof, a hanging bar, and a bracket including a mounting plate having a first face and an opposing second face, an anchor protruding from the first face of the mounting plate and configured for detachable locking engagement with a selected slot of the plurality of slots of the vertical support shaft, and a racking plate extending perpendicularly relative to the mounting plate. The racking plate defines a vertically-extending gap configured for receipt of the hanging bar.

In aspects, the bracket may further include a stabilizing plate extending from the racking plate.

In aspects, the mounting plate may include a pair of first and second mounting plates extending from respective upper and lower portions of the racking plate. The stabilizing plate may be positioned between the pair of first and second mounting plates and may extend coplanar with the racking plate.

In aspects, the racking plate may include a pair of vertical fingers joined by a lower body. The pair of vertical fingers may be spaced from one another to define the vertically-extending gap.

In aspects, a first finger of the pair of vertical fingers may be directly adjoined to the mounting plate and a second finger of the pair of vertical fingers may be free-standing.

In aspects, the present disclosure also relates to a vegetation hanging and drying system. The vegetation hanging and drying system includes a vertical support shaft that defines a plurality of slots along a length thereof, a hanging bar, and a pallet-rack bracket. The pallet-rack bracket includes a mounting plate, an anchor key, a racking plate, and a stabilizer. The mounting plate having a first face and an opposing second face. The anchor key protrudes from the first face of the mounting plate and is configured to be detachably engaged with a selected slot of the plurality of slots of the vertical support shaft. The racking plate extends perpendicularly from the second face of the mounting plate, and the stabilizer that extends downward and rearwardly away from the racking plate.

As used herein, the terms parallel and perpendicular are understood to include relative configurations that are substantially parallel and substantially perpendicular up to about + or −10 degrees from true parallel and true perpendicular.

BRIEF DESCRIPTION OF DRAWINGS

A better understanding of the features and advantages of the disclosed technology will be obtained by reference to the following detailed description that sets forth illustrative aspects, in which the principles of the technology are utilized, and the accompanying figures of which.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

As will be described in detail below, the present disclosure is directed to various aspects of brackets for use in vegetation hanging and drying systems. One of the vegetation hanging and drying systems includes a dry space, such as, a harvest hang harvesting structure, a tower hang harvesting structure, or a pod hang harvesting structure, at least one pair of brackets, at least one horizontal hanging bar, and at least one hanger, such as a vegetation hanger or a vegetation hanger.

Figure 1:
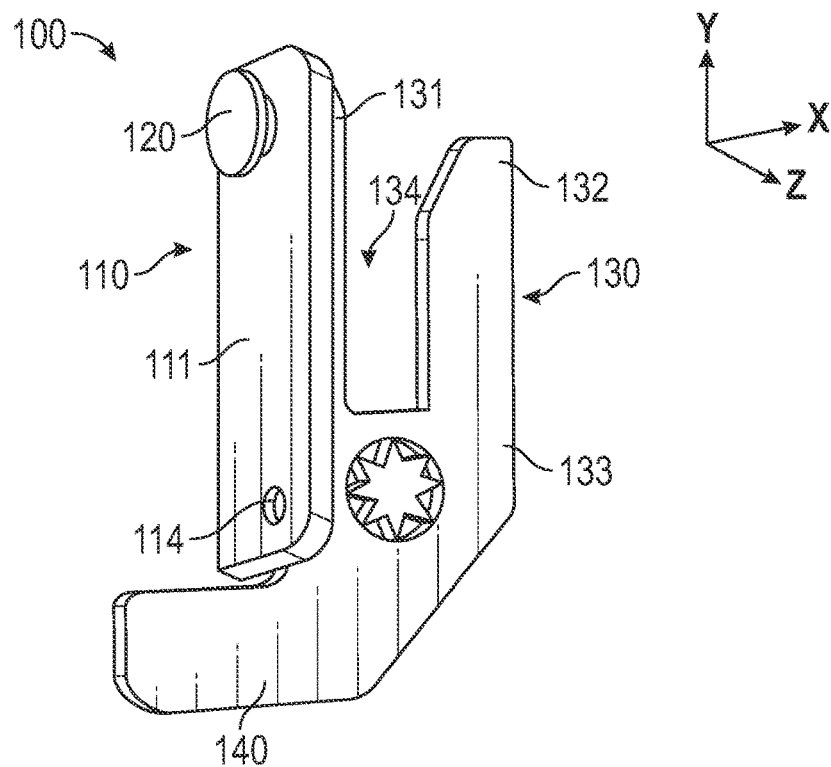
FIG. 1 is a rear, side perspective view of a pallet-rack bracket for use in a vegetation hanging and drying system in accordance with the present disclosure.
Figure 2:
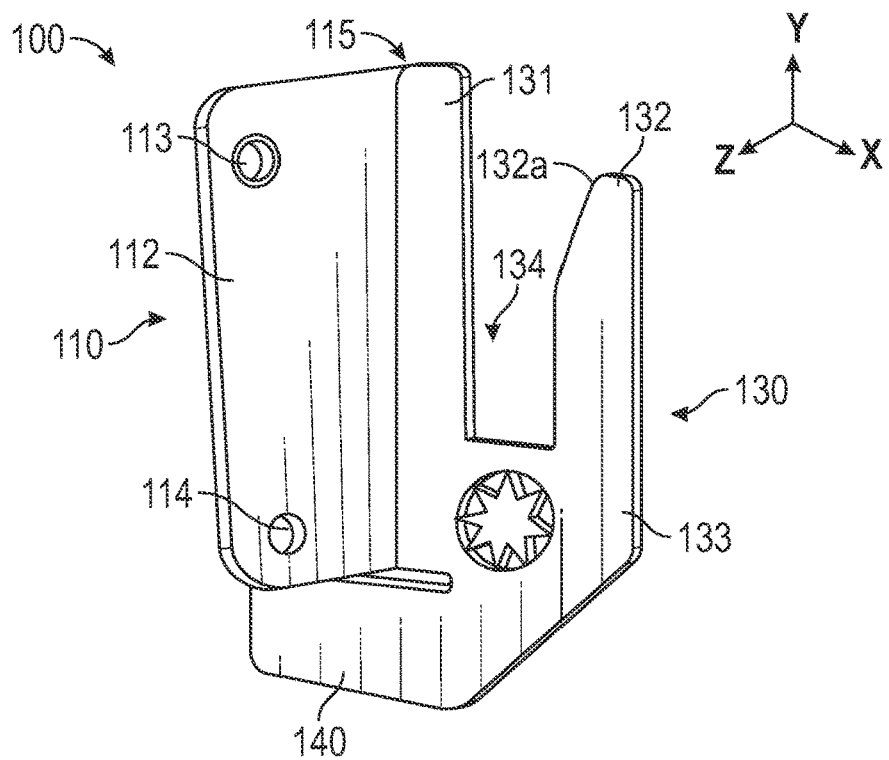
FIG. 2 is a front, side perspective view of the pallet-rack bracket of FIG. 1.
Figure 3:
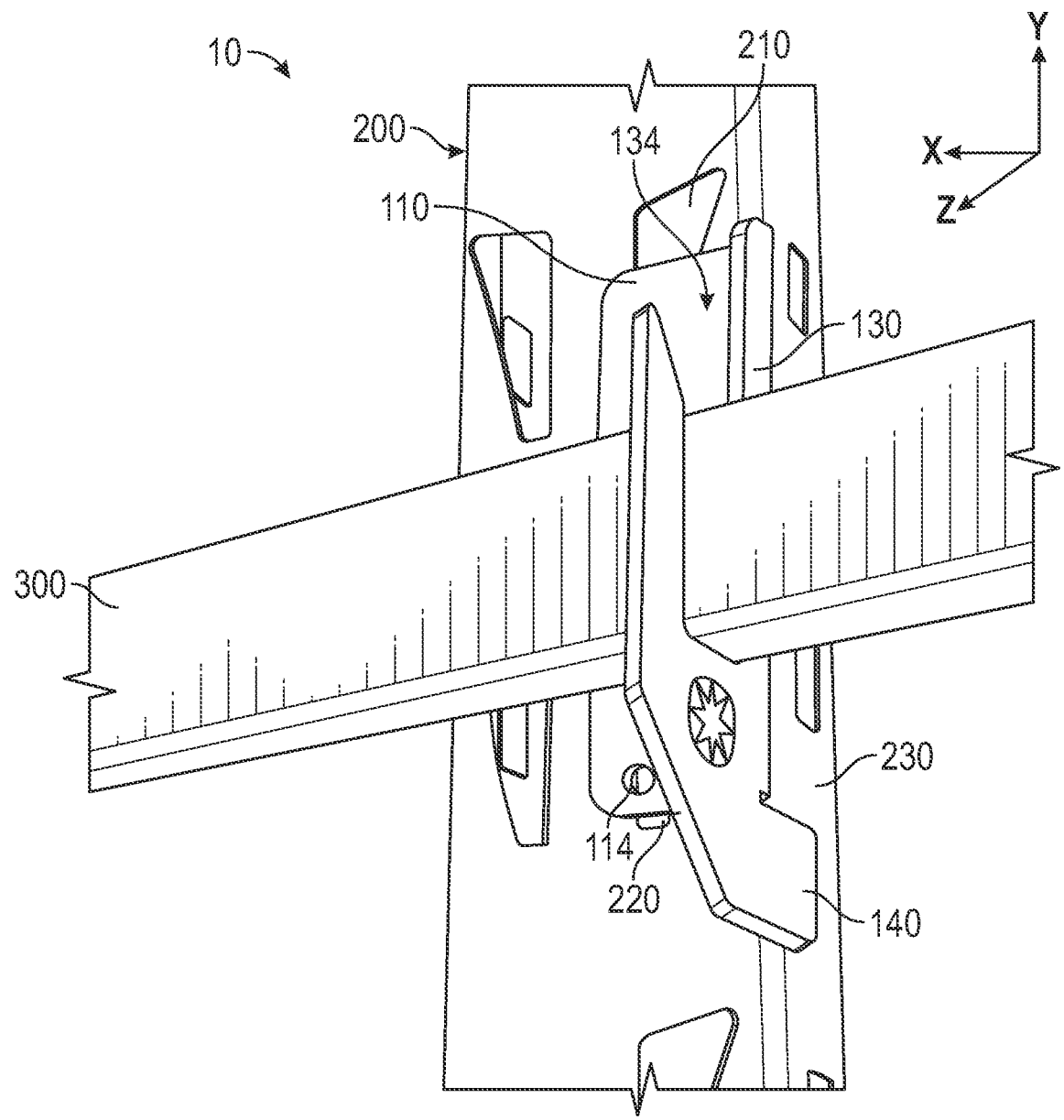
FIG. 3 is a front, side perspective view of the pallet-rack bracket of FIG. 1 in use with a vertical support shaft and a hanging bar from a vegetation hanging and drying system.

FIGS. 1-3 illustrate a bracket, such as, for example, a pallet-rack bracket 100 generally including a mounting plate 110, a racking plate 130, and a stabilizing plate 140. The bracket 100 may be a monolithic structure formed from a single sheet of material (e.g., metal). During manufacturing, the section intended to be used as the mounting plate 110 is folded inward toward the racking plate 130 until the two plates 110, 130 are perpendicularly oriented to one another, as shown. Both plates 110, 130 share a common vertical axis (Y-axis), but are approximately perpendicular to one another horizontally so that the mounting plate 110 extends along the Z-axis, and the racking plate 130 extends along the X-axis. The stabilizing plate 140 remains in alignment with the racking plate 130 and also extends along the X-axis.

This process of reorienting the mounting plate 110 and the racking plate 130 by means of folding allows the pallet-rack bracket 100 to remain as one monolithic structure, while facing in different directions thereby avoiding the loss of structural integrity brought about by joining two separate pieces together. However, in some aspects, the structural integrity of the pallet-rack bracket 100 is not the only consideration and the orthogonal orientation of the mounting plate 110 relative to the racking plate 130 can be accomplished by the temporary or permanent joining of two separate pieces representing the mounting plate 110 and the racking plate 130. For example, the plates 110, 130 may be joined using adhesives, welding, fasteners, etc.

The mounting plate 110 provides an initial point of integration with the larger vegetation hanging and drying system 10 (FIG. 3) because the mounting plate 110 defines an anchor key 120 configured to be removably attached to a vertical support shaft 200 of the vegetation hanging and drying system 10. The racking plate 130 provides a secondary point of integration with the larger vegetation hanging and drying system 10, because the racking plate 130 defines a gap 134 configured to receive a hanging bar 300 of the vegetation hanging and drying system 10. The stabilizing plate 140 provides a third point of integration with the larger vegetation hanging and drying system 10. The stabilizing plate 150 rests against an outer sidewall 230 of the vegetation hanging and drying system 10 to hold the pallet-rack bracket 100 in place and to provide additional stability to the racking plate 130 when supporting the hanging bar 300.

Figure 4:
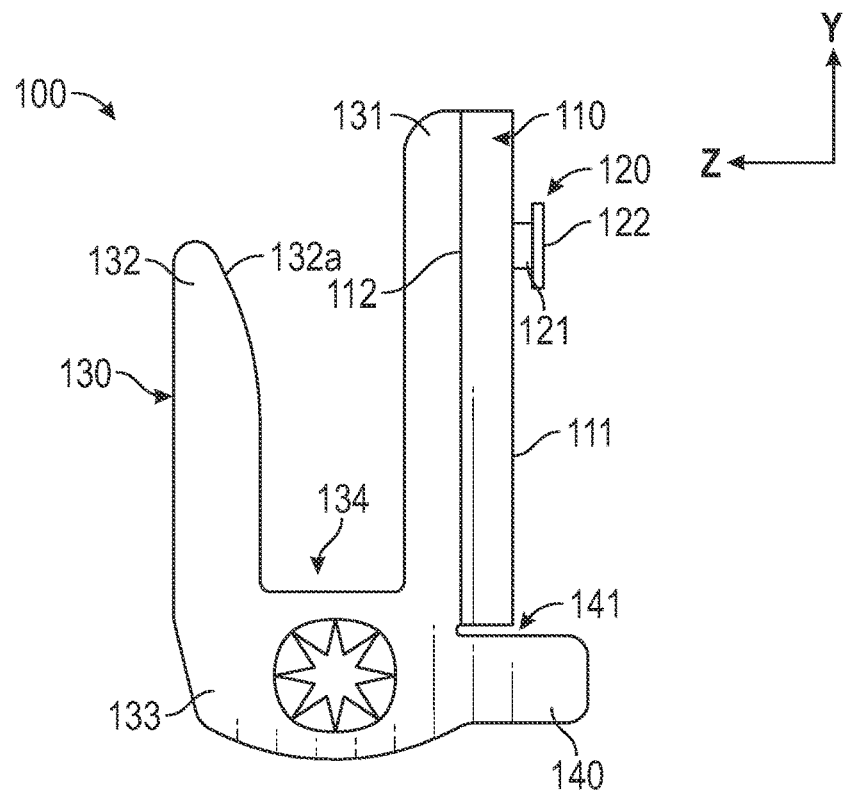
FIG. 4 is a side view of the pallet-rack bracket of FIG. 1.

With reference to FIGS. 1 and 4, the mounting plate 110 includes a distal or first face 111, and an anchor key 120 that protrudes from a top end portion of the distal face 111 of mounting plate 110. The anchor key 120 includes a body portion 121 that extends distally away from the mounting plate 110 and an end portion 122 affixed to the distal end of the body portion 121, such that the body portion 121 creates a small region of separation between the end portion 122 and the distal face 111 of the mounting plate 110. Additionally, the body portion 121 is smaller in diameter than the end portion 122 to facilitate coupling with the vertical shaft 200 (see FIG. 3) of the hanging and drying system 10.

Generally, the vertical shaft 200 includes a vertical slot 210 (see FIG. 3) that is broader at the top and narrower at the bottom. This design allows for the broader end portion 122 to be inserted through the top end of the vertical slot 210 and slid down into a secure position. Once in position, the narrower body portion 121 of the anchor 120 is supported by the narrower bottom end of the vertical slot 210 and the broader end portion 122 of the anchor plate 120 is also held in position by the narrower bottom end of the vertical slot 210. In aspects, the body portion 121 may be cylindrical in shape and the end portion 122 may be circular in shape such that the diameter of the end portion 122 is larger than the diameter of the body portion 121. In other aspects, the body portion 121 and end portion 122 can assume any suitable shape so long as the end portion 122 remains larger than the body portion 121, such that the anchor key 120 can be inserted through a vertical slot 210 and be thereby coupled to a vertical shaft 200 of the vegetation hanging and drying system 10. In yet other aspects, the anchor 120 can be molded from the same sheet as the mounting plate 110, such that the entire pallet-rack bracket 100 is one monolithic structure ensuring high structural integrity. Alternatively, in still other aspects, the anchor plate 120 can be formed from a completely separate piece, such that the mounting plate 110 and the anchor plate 120 are temporarily or permanently joined after the fact.

With reference to FIGS. 2 and 3, as previously mentioned, the racking plate 130 shares a vertical axis with the mounting plate 110. While the mounting plate 110 is focused on coupling the pallet-rack bracket 100 to a vertical support shaft 200 of the vegetation hanging and drying system 10, the racking plate 130 supports the hanging bar 300 from which vegetation is suspended during the drying process. The racking plate 130 includes a pair of vertical fingers 131, 132 that are joined together by a lower body 133 to define a gap 134 configured to receive a hanging bar 300 of the vegetation hanging and drying system 10. The gap 134 is large enough to receive the hanging bar 300, but at the same time is also narrow enough to prevent unnecessary shifting of the hanging bar 300 along the lower body 133 when installed. A first finger 131 of the pair of vertical fingers is directly adjoined to the mounting plate 110 and extends upward to the same height as the mounting plate 110. A second finger 132 of the pair of vertical fingers is freestanding and extends to a height less than that of the first finger 131.

In use, the pallet-rack bracket 100 may be installed at a high position on the vertical support shaft 200 that is difficult to reach for a person standing on the ground. The shorter height of the second finger 132 makes it easier for a person standing below the pallet-rack bracket 100 to place the hanging bar 300 into position in the gap 134 between the pair of vertical fingers 131, 132. In some aspects, the upper end of the second vertical finger 132 has a ramped edge 132a such that a hanging bar 300 being pushed upward will be more readily ejected from the gap 134. As such, the ramped edge 132a of the second finger 132 facilitates removal of the hanging bar 300 and/or positioning of the hanging bar 300 into the gap 134. In other aspects, the second vertical finger 132 may be coupled with a locking mechanism capable of firmly securing the hanging bar 300 within the gap 134 of the racking plate 130.

Referring now to FIGS. 3 and 4, the stabilizing plate 140 extends from the racking plate 130 in a downward direction to occupy a vertical space beneath both the mounting plate 110 and the racking plate 130. The stabilizing plate 140 also extends distally backward to occupy a longitudinal space behind both the mounting plate 110 and the racking plate 130. By occupying this space, both below and behind the other plates 110, 130, the stabilizing plate 140 is uniquely positioned to provide a form of leveraged support for the pallet-rack bracket 100 as a whole. In use, the stabilizing plate 140 rests against an outer sidewall 230 of the vertical support shaft 200 of the vegetation hanging and drying system 10. By resting against the outer sidewall 230, the stabilizing plate 140 ensures that the pallet-rack bracket 100 cannot rotate out of position in the clockwise direction. Further, when a hanging bar 300 is inserted into the gap 134 of the racking plate 130, any clockwise torque will push the stabilizing plate 140 against the outer sidewall 230 of the vertical support shaft 200. As such, in addition to the direct support provided by the racking plate 130, the stabilizing plate 140 also provides leveraged support for the hanging bar 300 inserted into the gap 134 that increases the overall stability of the vegetation hanging and drying system.

In aspects, the pallet-rack bracket 100 also includes a second slot 141 between the mounting plate 110 and the stabilizing plate 140. This second slot 141 provides the stabilizing plate 140 and the racking plate 130 with an additional range of lateral motion independent from the influence of the mounting plate 110. As such, in the event that excessive lateral force is applied to the bracket 100 while the mounting plate 110 is coupled to a vertical support shaft 200, the additional range of lateral motion provided by the second slot 141 gives the stabilizing plate 140 enough flexibility to potentially bend without breaking while continuing to provide leveraged support for the hanging bar 300.

Figure 5:
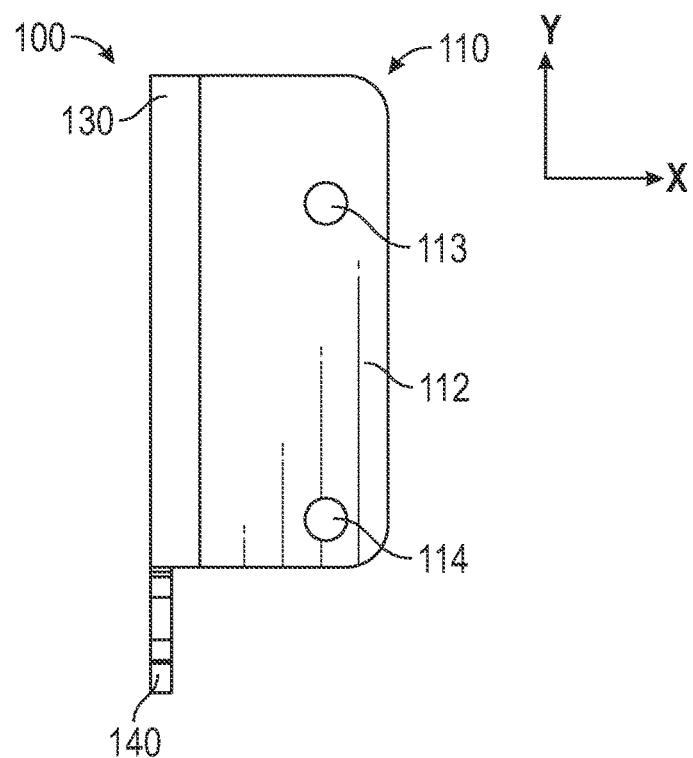
FIG. 5 is a rear view of the pallet-rack bracket of FIG. 1.
Figure 6A:
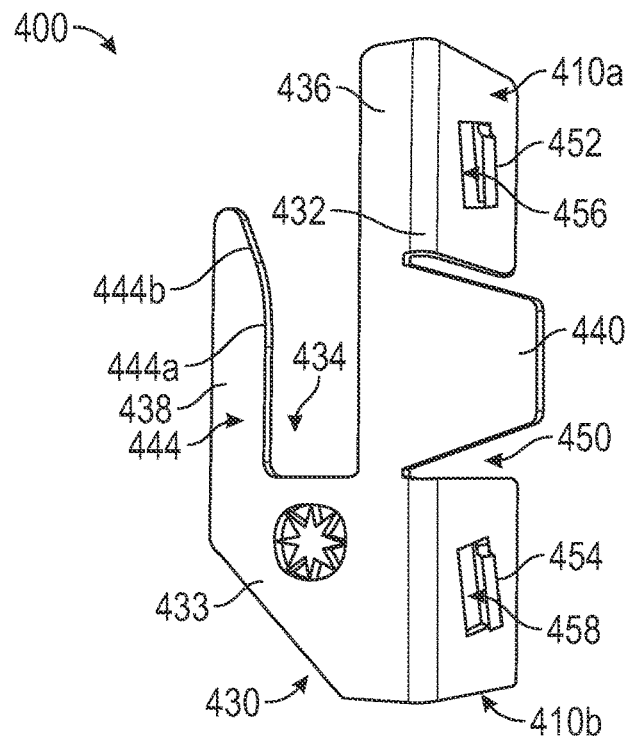
FIG. 6A is a rear, perspective view illustrating another aspect of the bracket for use in a vegetation and drying system in accordance with the present disclosure.
Figure 6B:
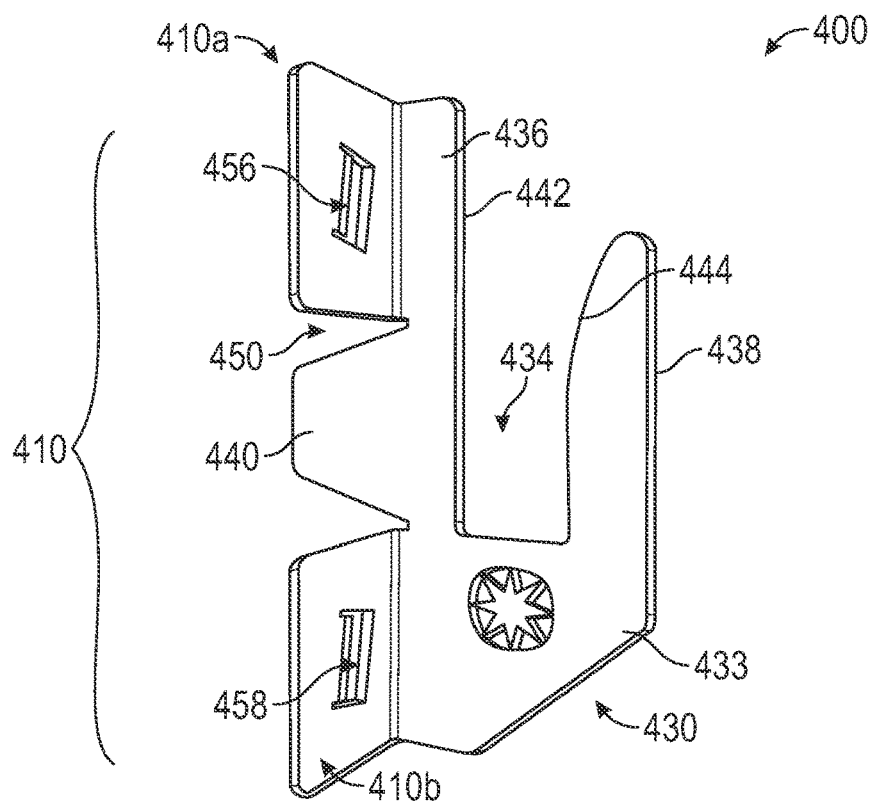
FIG. 6B is a front, perspective view illustrating the bracket of FIG. 6A.

With reference to FIGS. 3 and 5, the mounting plate 110 includes a proximal face 112 having a marker 113 that lines up directly with the position of the anchor key 120 on the distal face. In use, this marker 113 allows a person coupling a pallet-rack bracket 100 to a vertical support shaft 200 to line up the broad end portion 122 of the anchor key 120 with the broad upper portion of the vertical slot 210 without needing to see the mounting plate 110 from behind. In aspects, the marker 113 can be an indentation formed in the place where the anchor key 120 is pressed out to protrude from the distal face 111. In other aspects, the marker 113 can be any suitable visual indicator of position.

In aspects, the proximal or second face 112 of the mounting plate 110 may also includes an aperture 114 that aligns with a secondary slot 220 disposed on the vertical support shaft 200 of the vegetation hanging and drying system 10. The aperture 114 is sized to receive a fastener, such that the fastener can be inserted through both the mounting plate 110 and secondary slot 220 of the vertical support shaft 200 to further secure the position of the pallet-rack bracket 100 relative to the vertical support shaft 200.

With reference to FIGS. 6A-6C, 7, and 8, another type of bracket 400 for use in the vegetation hanging and drying system 10 (FIG. 3) is shown. The bracket 400 is similar to and may include any of the features of the bracket 100 of FIGS. 1-5 except as explicitly contradicted below.

Figure 7:
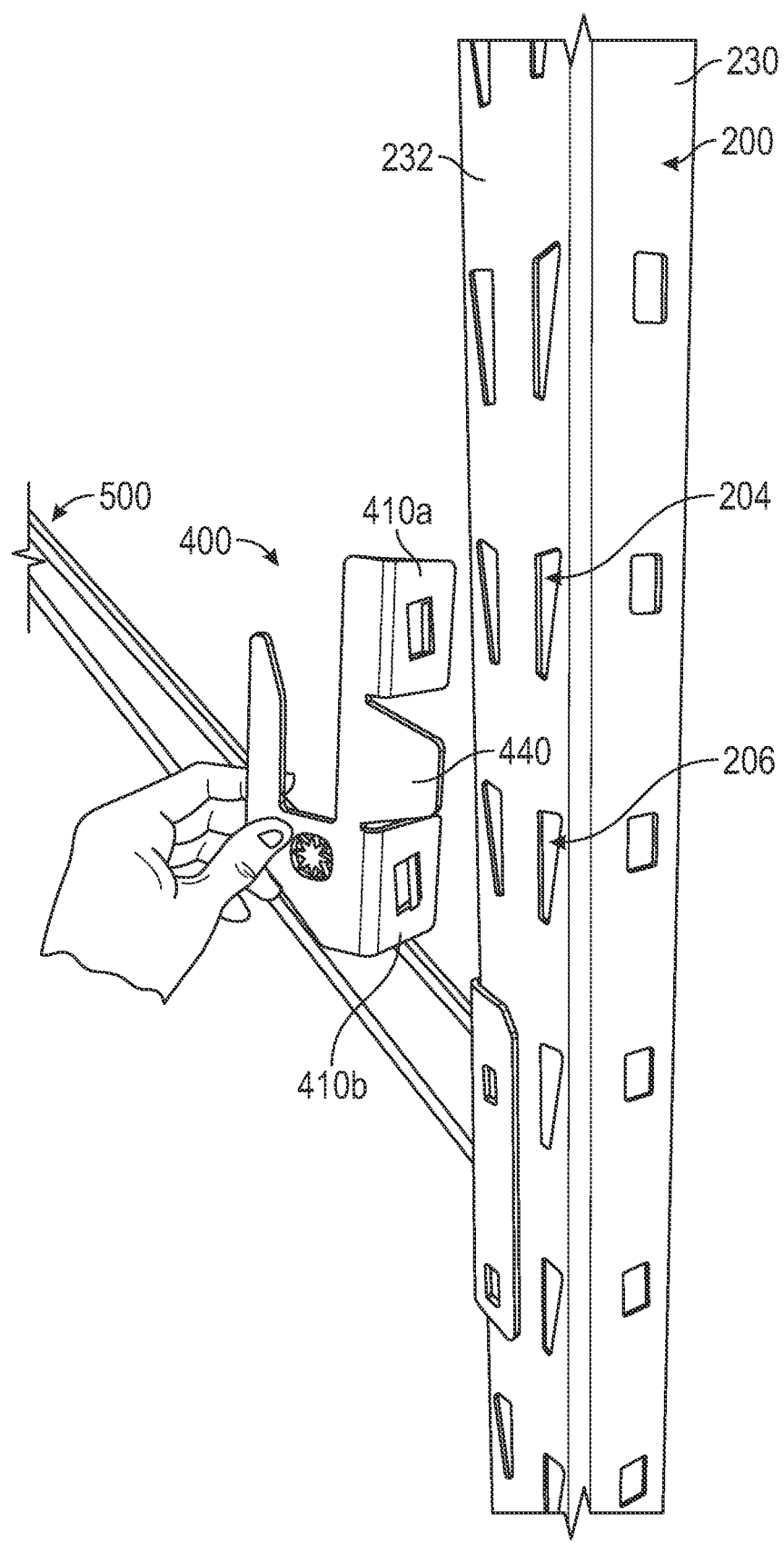
FIG. 7 is a perspective view illustrating the bracket of FIGS. 6A-6B being connected to a vertical support shaft of a shelving unit.

The bracket 400 is configured to fixedly secure to a vertical support shaft 200 (FIGS. 7-8) of the vegetation hanging and drying system 10, and to support a horizontal hanging bar 300 (FIG. 3) from which vegetation is suspended during a drying process of the vegetation. In aspects, the vertical support shaft 200 may be part of a shelving unit 500 (FIG. 7). The bracket 500 generally includes a racking plate 430, a mounting plate 410 extending perpendicularly from a longitudinal edge 432 of the racking plate 430, and a support tab or stabilizing plate 440 projecting from the longitudinal edge 432 of the racking plate 430. The components of the bracket 400 may be monolithically formed from a single sheet of material (e.g., stainless steel). In other aspects, the components of the bracket 400 may be integrally connected to one another via any suitable fastener, such as, for example, adhesive, welding, or the like.

The racking plate 430 includes first and second vertically-extending fingers 436, 438 that are joined together by a lower body 433 of the racking plate 430. The fingers 436, 438 define a vertically-extending gap 434 therebetween configured to receive the hanging bar 300 (FIG. 3) of the vegetation hanging and drying system 10. The gap 434 may have a rectangular shape and a sufficient width to receive the hanging bar 300 and permit sliding along a longitudinal axis of the hanging bar 300 while preventing shifting of the hanging bar 300 within the gap 434.

The first finger 436 is directly adjoined to the mounting plate 410 and the stabilizing plate 440 and extends at a perpendicular angle relative thereto. The first finger 436 may have the same height as the mounting plate 410 and has an inner edge 442 extending approximately three-quarters of the height of the mounting plate 410. The second finger 438 is free-standing and extends upwardly from the lower body 433 to a height less than that of the first finger 436. The second finger 438 has an inner edge 444 having a linear lower portion 444a and a ramped upper portion 444b. The inner edge 442 of the first finger 436 and the linear lower portion 444a of the inner edge 444 of the second finger 438 define a rectilinear portion of the gap 434 therebetween. The ramped upper portion 444b of the inner edge 444 of the second finger 438 facilitates entry and removal of the hanging bar 300 into and from the gap 434.

The mounting plate 410 of the bracket 400 includes a pair of first and second mounting plates 410a, 410b that extend perpendicularly from the longitudinal edge 432 of the racking plate 430. The first and second mounting plates 410a, 410b are vertically separated from one another along a length of the racking plate 430 to define a gap 450 therebetween. The first mounting plate 410a extends perpendicularly from an upper portion of the first finger 436 of the racking plate 430 and the second mounting plate 410b extends perpendicularly from the lower body 433 of the racking plate 430. The first and second mounting plates 410a, 410b may each be square shaped and have a movable anchor or tab 452, 454 extending outwardly therefrom. It is contemplated that the tabs 452, 454 may be cut from the mounting plates 410a, 410b. The tabs 452, 454 may extend away from the respective first and second mounting plates 410a, 410b to define a recess 456, 458 configured for capturing an edge 202 (FIG. 8) of the vertical support shaft 200 therebetween. The tabs 452, 454 may statically bendable or deformable to allow for an adjustment of the size of the respective recess 456, 458.

The stabilizing plate 440 extends from and is coplanar with the first finger 436 of the racking plate 430. The stabilizing plate 440 extends through the gap 450 defined between the first and second mounting plates 410a, 410b and has a trapezoidal shape, but other shapes are also contemplated, such as, for example, rounded, squared, or the like. The stabilizing plate 440 is configured to rest against a first outer sidewall 230 (FIG. 7) of the vertical support shaft 200 of the vegetation hanging and drying system 10. By resting against the first outer sidewall 230, the stabilizing plate 440 ensures that the bracket 400 is resisted from rotating out of position. Further, when a horizontal hanging bar 300 is inserted into the gap 434 of the racking plate 430, any torque will push the stabilizing plate 440 against the outer sidewall 230 of the vertical support shaft 200. As such, in addition to the direct support provided by the racking plate 430, the stabilizing plate 440 also provides leveraged support for the hanging bar 300 inserted into the gap 434 that increases the overall stability of the vegetation hanging and drying system 10.

In use, the bracket 400 is positioned adjacent the vertical support shaft 200 of a shelving unit 500, as shown in FIG. 7. The first and second mounting plates 410, 410b are positioned into abutment with a second outer sidewall 232 of the vertical support shaft 200 and the stabilizing plate 440 is positioned into abutment with the first outer sidewall 320 of the vertical support shaft 200. The tabs 452, 454 of the mounting plates 410a, 410b are inserted within first and second tapered slots 204, 206 defined in the second outer sidewall 232 of the vertical support shaft 200 and the bracket 400 is translated downward.

Figure 8:
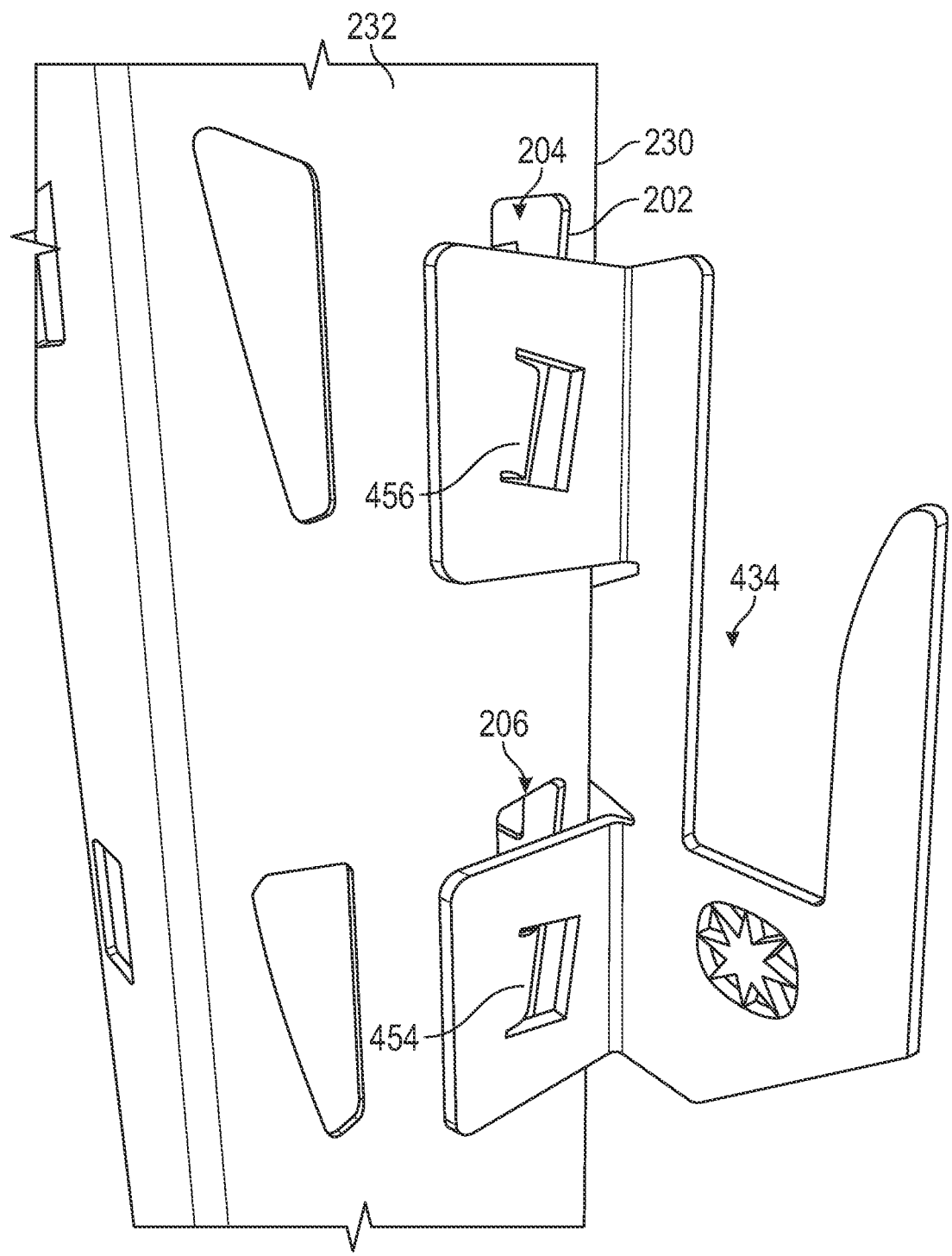
FIG. 8 is a front, perspective view illustrating the bracket of FIGS. 6A-6B secured to the vertical support shaft of the shelving unit.

During downward translation of the bracket 400 relative to the vertical support shaft 300, the tapered slots 204, 206 of the vertical support shaft 200 bend or deform the tabs 452, 454 of the mounting plates 410a, 410b to snugly secure the tabs 452, 454 with the tapered slots 204, 206 of the vertical support shaft 200, as shown in FIG. 8. This process is repeated with a second bracket (not shown), identical to bracket 400, to secure the second bracket with a second support shaft (not shown), identical to the first support shaft 200, of the shelving unit 500 and at a vertical location of the second support shaft that is horizontally aligned with the bracket 400 secured to the first vertical support shaft 200. With the brackets 400 secured to the vertical support shafts 200, the hanging bar 300 (FIG. 3) is positioned within the gaps 434 of the racking plates 430 of the brackets 400 to support the horizontal hanging bar 300 in a horizontal orientation.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed:

1. A bracket for use in a vegetation hanging and drying system, the bracket comprising:
   a mounting plate configured to abut a vertical support shaft of the vegetation hanging and drying system;
   an anchor attached to the mounting plate and configured to secure the mounting plate to the vertical support shaft;
   a racking plate protruding from the mounting plate and defining a vertically-extending gap configured for receipt of a horizontal hanging bar, the racking plate including a pair of vertical fingers joined by a lower body to define the vertically-extending gap; and
   a stabilizing plate extending away from the racking plate, wherein the mounting plate includes a pair of first and second mounting plates extending substantially perpendicular from a longitudinal edge of the racking plate, and wherein the stabilizing plate extends between the pair of first and second mounting plates and is coplanar with the racking plate, and wherein the second mounting plate of the pair of first and second mounting plates extends substantially perpendicular from the lower body of the racking plate.

2. The bracket of claim 1, wherein the anchor is configured to be inserted through a slot defined in the vertical support shaft of the vegetation hanging and drying system.

3. The bracket of claim 1, wherein a first finger of the pair of vertical fingers is directly adjoined to the mounting plate and a second finger of the pair of vertical fingers is free-standing.

4. The bracket of claim 3, wherein the first finger of the pair of vertical fingers is taller than the second finger of the pair of vertical fingers.

5. The bracket of claim 1, wherein each of the first and second mounting plates has a respective anchor.

6. The bracket of claim 5, wherein the stabilizing plate is configured to rest against an outer sidewall of the vertical support shaft of the vegetation hanging and drying system.

7. The bracket of claim 6, wherein the anchor of each of the first and second mounting plates is configured to bend outwardly.

8. The bracket of claim 1, wherein the stabilizing plate extends underneath and rearwardly beyond the mounting plate to provide additional leveraged support for the horizontal hanging bar of the vegetation hanging and drying system.

9. The bracket of claim 1, wherein the anchor is attached to a central portion of the mounting plate, the anchor including a recess defined in a central, backside portion thereof.

10. The bracket of claim 1, wherein a second finger of the pair of vertical fingers includes an inner edge having a linear lower portion and a ramped upper portion.

11. A bracket for use in a vegetation hanging and drying system, the bracket comprising:
- a mounting plate configured to abut a vertical support shaft of the vegetation hanging and drying system;
- an anchor attached to the mounting plate and configured to secure the mounting plate to the vertical support shaft;
- a racking plate protruding from the mounting plate and defining a vertically-extending gap configured for receipt of a horizontal hanging bar, the racking plate including a pair of vertical fingers joined by a lower body to define the vertically-extending gap,
- wherein a first finger of the pair of vertical fingers is directly adjoined to the mounting plate and a second finger of the pair of vertical fingers is free-standing, and wherein the first finger of the pair of vertical fingers includes a linear, inner edge and the second finger of the pair of vertical fingers includes an inner edge having a linear lower portion and a ramped upper portion, the first finger of the pair of vertical fingers having the same height as the mounting plate; and
- a stabilizing plate extending away from the racking plate, the stabilizing plate extending substantially perpendicular relative to a longitudinal edge of the first finger of the pair of vertical fingers,
- wherein the mounting plate includes a pair of first and second mounting plates extending substantially perpendicular from a longitudinal edge of the racking plate, and wherein the stabilizing plate extends between the pair of first and second mounting plates and is coplanar with the racking plate, and wherein the second mounting plate of the pair of first and second mounting plates extends substantially perpendicular from the lower body of the racking plate.

12. A bracket for use in a vegetation hanging and drying system, the bracket comprising:
- a mounting plate configured to abut a vertical support shaft of the vegetation hanging and drying system;
- an anchor attached to the mounting plate and configured to secure the mounting plate to the vertical support shaft;
- a racking plate protruding from the mounting plate and defining a vertically-extending gap configured for receipt of a horizontal hanging bar, the racking plate including a pair of vertical fingers joined by a lower body to define the vertically-extending gap,
- wherein a first finger of the pair of vertical fingers is directly adjoined to the mounting plate and a second finger of the pair of vertical fingers is free-standing, and wherein the first finger of the pair of vertical fingers includes a linear, inner edge and the second finger of the pair of vertical fingers includes an inner edge having a linear lower portion and a ramped upper portion, the first finger of the pair of vertical fingers having the same height as the mounting plate; and
- a stabilizing plate extending away from the racking plate, the stabilizing plate extending substantially perpendicular relative to a longitudinal edge of the first finger of the pair of vertical fingers,
- wherein the mounting plate includes a pair of first and second mounting plates extending substantially perpendicular from a longitudinal edge of the racking plate, each of the first and second mounting plates having a respective anchor configured to bend outwardly, and wherein the stabilizing plate extends between the pair of first and second mounting plates and is coplanar with the racking plate, and wherein the second mounting plate of the pair of first and second mounting plates extends substantially perpendicular from the lower body of the racking plate.

13. The bracket of claim 12, wherein the first mounting plate of the pair of first and second mounting plates extends substantially perpendicular from an upper portion of the first finger of the pair of vertical fingers.

14. The bracket of claim 12, wherein the stabilizing plate has a trapezoidal shape and each of the first and second mounting plates has a rectangular shape.

15. The bracket of claim 12, wherein the vertically-extending gap has a rectangular shape and is configured to permit sliding along a longitudinal axis of the horizontal hanging bar.

* * * * *